United States Patent

[11] 3,536,145

| [72] | Inventor | David A. Clark<br>1611 S. Riverside Drive, Tulsa, Oklahoma 74119 |
|---|---|---|
| [21] | Appl. No. | 846,630 |
| [22] | Filed | July 15, 1969<br>Continuation of Ser. No. 704,151, Feb. 8, 1968, abandoned. |
| [45] | Patented | Oct. 27, 1970 |

[54] ATTACHING MEANS FOR A SOIL SEALER
2 Claims, 4 Drawing Figs.

[52] U.S. Cl. .................................................... 172/710, 172/766, 111/7

[51] Int. Cl. ......................................................... A01b 35/24

[56] References Cited
UNITED STATES PATENTS
2,242,486  5/1941  Sutherland .................. 172/277

*Primary Examiner*—Robert E. Pulfrey
*Assistant Examiner*—Alan E. Kopecki
*Attorney*—R. E. Zimmerman ABSTRACT: A new and improved means for attaching soil sealers to a support. The new and improved attaching means does not require the present practice of removing the bolts to assemble or remove the soil sealers.

Patented Oct. 27, 1970 3,536,145

INVENTOR.
DAVID A. CLARK
BY
ATTORNEY

ATTACHING MEANS FOR A SOIL SEALER

This is a continuation of application Ser. No. 704,151, filed February 8, 1968 now abandoned.

This invention relates to a new and improved soil sealer assembly with means improvised to quickly and easily attach and detach the soil sealers, such as springtine, paddel, drag, rod and disc sealers to and from a support. In the preferred embodiment, the support is a spring shank. The spring shank is that part of the anhydrous ammonia feeding apparatus which prepares the ground for injection of either anhydrous ammonia or any other suitable liquid fertilizer into the ground. In addition to preparing the soil for injection of the fertilizer into the ground to obtain the maximum fertilizing benefits, it is important to cover the furrows of the ground immediately after the soil is treated with the fertilizer. This is the function of soil sealers, that is, to move the soil in such a manner so as to cover the furrows made by the spring shank with knives attached.

Presently, the soil sealers are attached to spring shanks by bolts with appropriate washers and nuts. The present practice is to remove the soil sealers completely by removing the assembly nuts holding the soil sealers to the spring shank. When the apparatus is prepared for transportation, it is on occasion necessary to remove the soil sealers when the apparatus is being moved from one location to another. To remove the soil sealers frequently is a rather tedious and time-consuming task, since the structure of the equipment used for feeding anhydrous ammonia into the ground is very wide, containing many shanks with various types of soil sealers attached. When the fertilizer equipment is placed in transit, it is necessary to make the equipment more compact so it can be easily moved. This is done by folding the sections of the feeding devices into a compact mass. Presently, in folding the many sections of the fertilizing equipment which contain the shanks, the soil sealers have to be removed because of the close spacing of the shanks. Since the shanks are closely spaced, the soil sealers in an assembled position strike and crowd each other when stacking the equipment, so that it is sometimes impossible to properly stack the feeding mechanism without removing the soil sealers when moving the equipment from one area to another. This necessitates the removal of certain of the soil sealers from the shank assembly. The present method of removal of the soil sealers has been explained previously in this paragraph. To alleviate this problem, I have invented a new assembling means which I shall disclose for attaching the soil sealers to the shank feeding apparatus.

The object of my invention is to provide a new and quick means for attaching and removing soil sealers from a support in agricultural machinery.

Another object of my invention is to eliminate the necessity of connecting and disconnecting the bolts in the soil sealers from the support for stacking the soil sealers during transportation.

Figure 1:
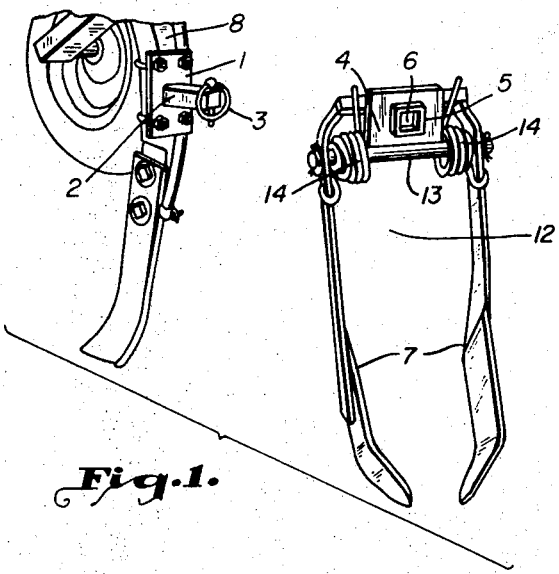
FIG. 1 illustrates a new and improved paddle sealer assembly in a separated position with the mounting block shown separated from the paddle sealer assembly.

Reference is made to FIG. 1 which shows the paddle sealer assembly 12 in a separated position from the mounting plate 1. This figure illustrates separately the mounting plate 1 with the mounting block 2 attached in position on a supporting spring shank 8 with the safety pin 3, also known as a klik pin, in a closed position. Directly to the side of the mounting plate 1 and block 2 is shown the paddle sealer assembly 12 with the new and improved quick connecting means in the form of a plate 4 with an opening 6 in the form of an open-end box providing means for attaching the paddle sealer assembly 12 to the mounting block 2. The paddle sealers 7 themselves are rotably mounted on shaft 13, which is welded as a portion of the support structure to plate 4. Both of the paddel sealers 7 are held in position on shaft 13 under tension by springs 14. Springs 14 are each mounted toward the end of shaft 13 with one end of each of the said springs 14 resting on plate 4, and the other end of the springs 14 positioned around the upper segment of both the paddle sealers 7. To easily mount the paddle sealer assembly 12, the klik pin 3, FIG. 1 is removed, the paddle sealer assembly 12 is placed on the mounting block 2 so that the opening 6 shown in the drawing FIG. 1 on upper mounting plate of the paddle sealer assembly 12 slides over a mounting block 2 a sufficient distance to enable the klik pin 3 to be inserted. The assembly is now in an operating position.

Figure 2:
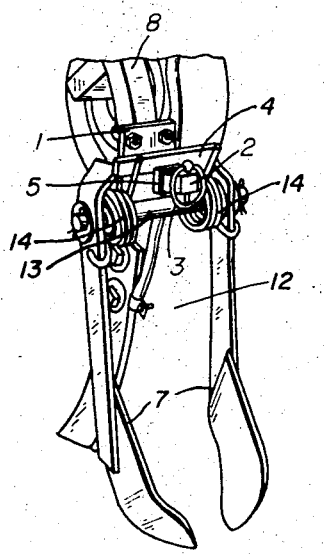
FIG. 2 illustrates the paddle sealer assembly in an operating or mounted position attached to a support behind agricultural equipment.

Reference is made to FIG. 2 which shows the new and improved paddle sealer structure in position with the mounting plate 1 which is attached to a support such as a spring shank 8. The mounting block 2 is attached to a plate 1, the block and the plate being secured to the support or spring shank with bolts, lock washers and nuts. A drilled hole through the end of the block 2 holds the klik pin assembly 3 which prevents the paddle sealer assembly 12 from sliding off the mounting block. In the preferred embodiment, the new and improved paddle sealer assembly consists of a plate 4 (FIG. 1) fabricated in place to form the upper form for the paddle sealers. Attached to the plate 1, see FIG. 1, at approximately a 90° angle is a protrusion 5 (FIG. 1) in the form of a square open-ended box shaped sleeve with an opening 6 (FIG. 1). The opening provides a means to slide the upper mounting plate of the paddle sealers over the square block 2 into operating position behind the support in the form of a spring shank 8.

Figure 3:
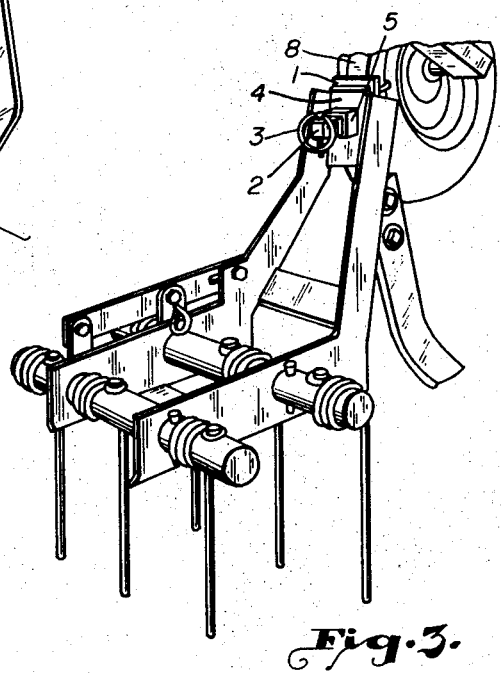
FIG. 3 illustrates another application of the use of a quick disconnecting means for a different type of soil sealer.

Reference is made to FIG. 3 which shows an additional application of the use of the quick disconnecting means explained in the preceding paragraphs. The positioning of the plate 4 in the upper structure of the sealer is a matter of choice and would not present any patentable distinction over the disclosure presented above.

Figure 4:
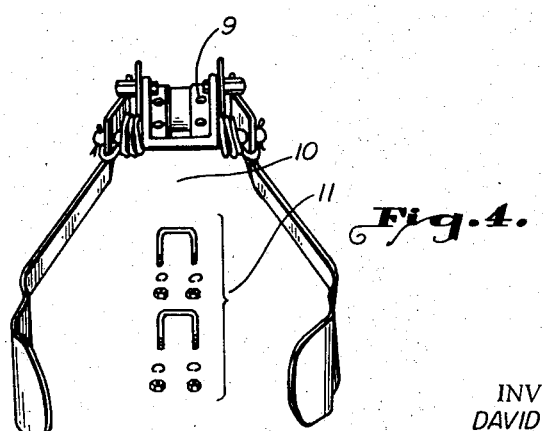
FIG. 4 illustrates the prior art showing the paddle sealers mounting plate presently being used and the bolts used for mounting the paddle sealers behind the support.

By viewing FIG. 4, which illustrates the prior art, it can readily be seen that the old method of connecting soil sealers is too tedious and slow.

The prior art shown in FIG. 4 shows paddle sealers 10 containing a plate 9 with four holes for inserting bolts 11 which are secured to the shanks with washers and nuts. The improved soil sealer assembly avoids the necessity of removing the bolts when the soil sealers are detached, and this makes the removal of the soil sealers from the support easier and unique. The improvement which is disclosed affords a rapid means of attaching the soil sealers to a support in agricultural equipment. This can readily be seen by referring to FIGS. 1, 2 and 3 and comparing the new and improved means of attaching the soil sealers to the means used in the prior art as shown in FIG. 4.

Reversing the structure of the connecting means is considered within the scope of this invention. Referring to FIG. 1, for instance, if the mounting 2 on the plate should be changed to be a hollow member in the form of a sleeve with a hole placed through it and the plate extending between the soil sealers should be changed to have a protrusion with a hole through it, mounted on the outer structure of the upper plate assembly, the protrusion could be inserted into the hollow member and held in place with a key inserted through the aligned holes in the protrusion and the hollow member. This reverse structure of my invention would be considred within the scope of this invention.

Various embodiments of this invention, in addition to what has been illustrated and described, can be employed without departing from the scope of the accompanying claims.

I claim:

1. The new and improved attaching means for a soil sealer assembly comprising:

a. a first plate, the said first plate forming the upper support structure for the soil sealers;

b. the said soil sealers being attached to the said first plate;

c. the said first plate having an opening, the said opening having a protrusion in the form of a sleeve, the said sleeve being attached to the first said plate in such a manner so as to be slidably mounted over a;

d. mounting block welded in a perpendicular position to a second plate; and e. the said second plate having punched holes with U-bolts for attaching to a support.

2. The new and improved attaching means for a soil sealer assembly as claimed in claim 1 where the said mounting block has a drilled hole in the extremity of the said mounting block with a safety pin resting in the said drilled hole in the said block.